US010265850B2

(12) United States Patent
Lim et al.

(10) Patent No.: US 10,265,850 B2
(45) Date of Patent: Apr. 23, 2019

(54) ROBOTIC SENSING APPARATUS AND METHODS OF SENSOR PLANNING

(71) Applicant: General Electric Company, Schenectady, NY (US)

(72) Inventors: Ser Nam Lim, Niskayuna, NY (US); David Scott Diwinsky, West Chester, OH (US); Xiao Bian, Schenectady, NY (US); Wayne Ray Grady, Hamilton, OH (US); Mustafa Gokhan Uzunbas, Albany, NY (US); Mustafa Devrim Kaba, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 15/342,500

(22) Filed: Nov. 3, 2016

(65) Prior Publication Data
US 2018/0117760 A1    May 3, 2018

(51) Int. Cl.
*B25J 9/16* (2006.01)
*G01B 11/24* (2006.01)
(Continued)

(52) U.S. Cl.
CPC ............. *B25J 9/163* (2013.01); *B25J 9/1661* (2013.01); *B25J 9/1694* (2013.01); *G01B 11/24* (2013.01);
(Continued)

(58) Field of Classification Search
CPC ........ B25J 9/163; B25J 9/1661; B25J 9/1694; B25J 9/1653; B25J 9/1669; G01B 11/24;
(Continued)

(56) References Cited

U.S. PATENT DOCUMENTS

| 4,531,192 A | * | 7/1985 | Cook | ..................... B23K 9/126 700/258 |
| 5,831,621 A | * | 11/1998 | Pito | ........................ G01B 11/24 345/419 |

(Continued)

OTHER PUBLICATIONS

Paletta, L. and Pinz, A., "Active object recognition by view integration and reinforcement learning," Robotics and Autonomous Systems, vol. 31, Issues 1-2, pp. 71-86 (Apr. 30, 2000).

(Continued)

*Primary Examiner* — Bao Long T Nguyen
(74) *Attorney, Agent, or Firm* — General Electric Company; Kristi L. Davidson

(57) ABSTRACT

The present disclosure is directed to a computer-implemented method of sensor planning for acquiring samples via an apparatus including one or more sensors. The computer-implemented method includes defining, by one or more computing devices, an area of interest; identifying, by the one or more computing devices, one or more sensing parameters for the one or more sensors; determining, by the one or more computing devices, a sampling combination for acquiring a plurality of samples by the one or more sensors based at least in part on the one or more sensing parameters; and providing, by the one or more computing devices, one or more command control signals to the apparatus including the one or more sensors to acquire the plurality of samples of the area of interest using the one or more sensors based at least on the sampling combination.

18 Claims, 3 Drawing Sheets

(51) Int. Cl.
*G05B 19/401* (2006.01)
*G05D 1/00* (2006.01)
*G06T 7/00* (2017.01)

(52) U.S. Cl.
CPC ......... *G05B 19/401* (2013.01); *G05D 1/0088* (2013.01); *G05D 1/0094* (2013.01); *G06T 7/0004* (2013.01); *G05B 2219/37441* (2013.01); *G05B 2219/37448* (2013.01); *G05B 2219/37451* (2013.01); *G05B 2219/40499* (2013.01); *G05B 2219/45066* (2013.01)

(58) Field of Classification Search
CPC ........ G05B 19/401; G05B 2219/37441; G05B 2219/37448; G05B 2219/37451; G05B 2219/40499; G05B 2219/45066; G05B 19/188; G05B 2219/40423; G05D 1/0088; G05D 1/0094; G06T 7/0004
USPC ........... 700/250, 246, 258; 706/25; 702/155, 702/167, 170, 171, 172; 73/863
See application file for complete search history.

(56) References Cited

U.S. PATENT DOCUMENTS

| | | | | |
|---|---|---|---|---|
| 8,705,842 B2* | 4/2014 | Lee | ...................... | G05D 1/0274 382/153 |
| 8,836,955 B2* | 9/2014 | Alvarez Diez | ...... | G01B 11/002 356/601 |
| 9,227,323 B1* | 1/2016 | Konolige | ................. | B25J 9/163 |
| 9,630,321 B2* | 4/2017 | Bradski | .................... | H04N 5/33 |
| 2002/0169586 A1 | 11/2002 | Rankin, II et al. | | |
| 2005/0284937 A1 | 12/2005 | Xi et al. | | |
| 2008/0221733 A1* | 9/2008 | Morrow | ............... | G05B 19/401 700/258 |
| 2010/0030382 A1* | 2/2010 | Shalat | .................... | B25J 13/087 700/258 |
| 2011/0033254 A1* | 2/2011 | Abrams | ................. | B23Q 17/22 408/1 R |
| 2015/0009301 A1* | 1/2015 | Ribnick | ............... | G01B 11/303 348/50 |
| 2015/0177194 A1* | 6/2015 | Xu | ........................ | G01N 29/043 73/641 |
| 2015/0254831 A1 | 9/2015 | Miyatani | | |
| 2016/0046373 A1 | 2/2016 | Kugelmass | | |
| 2016/0158942 A1* | 6/2016 | Augenbraun | .......... | B25J 9/1694 700/253 |
| 2017/0176990 A1* | 6/2017 | Keller | ..................... | G01S 17/42 |
| 2017/0355078 A1* | 12/2017 | Ur | .......................... | B25J 9/1612 |

OTHER PUBLICATIONS

Scott, W.R., "Model-based view planning," Machine Vision and Applications, vol. 20, Issue 1, pp. 47-69 (Jan. 2009) (Abstract).
International Search Report and Written Opinion issued in connection with corresponding PCT Application No. PCT/US2017/056072 dated Mar. 19, 2018.

* cited by examiner

ROBOTIC SENSING APPARATUS AND METHODS OF SENSOR PLANNING

FIELD

The present disclosure is related generally to robotic sensing devices and methods of sensor planning.

BACKGROUND

Sensor planning is a general requirement in inspections, measurements, and robot localization, navigation, or mapping relative to an area of interest. Areas of interest may include a component, part, detail, assembly, or spatial area, such as a geographic area or other 2D or 3D space. Additionally, a general requirement of inspection and measurement methods, and autonomous robotics, is to employ sensors to capture samples, such as images or measurements, of the area of interest in sufficient detail and a desired level of completeness.

A known solution for sensor planning is to utilize manually programmed sensor plans, such as coordinate systems, routes, or pathways, for capturing the desired area of interest. However, manually programmed sensor plans often require unchanging and/or substantially certain areas of interest. Therefore, areas of interest that deviate from the preprogrammed plan often result in sampling errors, omissions, or other failures.

Another known solution for sensor planning may include programming a robot to capture large quantities of samples to ensure the area of interest is captured in sufficient detail and a desired level of completeness. However, capturing large quantities of samples is similarly costly, time consuming, and results in inefficient quantities of redundant samples. Additionally, the unknown nominal areas of interest, or changes to the area of interest relative to nominal, may similarly result in errors, omissions, or failures to capture the desired area of interest.

Therefore, there exists a need for robotic sensing systems and methods of sensor planning that may capture samples of the desired and/or potentially unknown or changing area of interest in sufficient detail and completeness while minimizing redundancy and time.

BRIEF DESCRIPTION

Aspects and advantages of the invention will be set forth in part in the following description, or may be obvious from the description, or may be learned through practice of the invention.

The present disclosure is directed to a computer-implemented method of sensor planning for acquiring samples via an apparatus including one or more sensors. The computer-implemented method includes defining, by one or more computing devices, an area of interest; identifying, by the one or more computing devices, one or more sensing parameters for the one or more sensors; determining, by the one or more computing devices, a sampling combination for acquiring a plurality of samples by the one or more sensors based at least in part on the one or more sensing parameters; and providing, by the one or more computing devices, one or more command control signals to the apparatus including the one or more sensors to acquire the plurality of samples of the area of interest using the one or more sensors based at least on the sampling combination.

A further aspect of the present disclosure is directed to a robotic sensing apparatus for sensor planning. The apparatus includes one or more sensors and a computing device, in which the computing device includes one or more processors and one or more memory devices. The one or more memory devices store instructions that when executed by the one or more processors cause the one or more processors to perform operations. The operations include receiving an area of interest; receiving one or more sensing parameters for the one or more sensors; determining a sampling combination for acquiring a plurality of samples by the one or more sensors; and acquiring the plurality of samples using the one or more sensors based at least on the sampling combination.

A still further aspect of the present disclosure is directed to an apparatus for sensor planning. The apparatus includes a translating robotic apparatus, one or more sensors mounted to the translating robotic apparatus, and one or more computing devices configured to operate the translating robotic apparatus and the one or more sensors.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
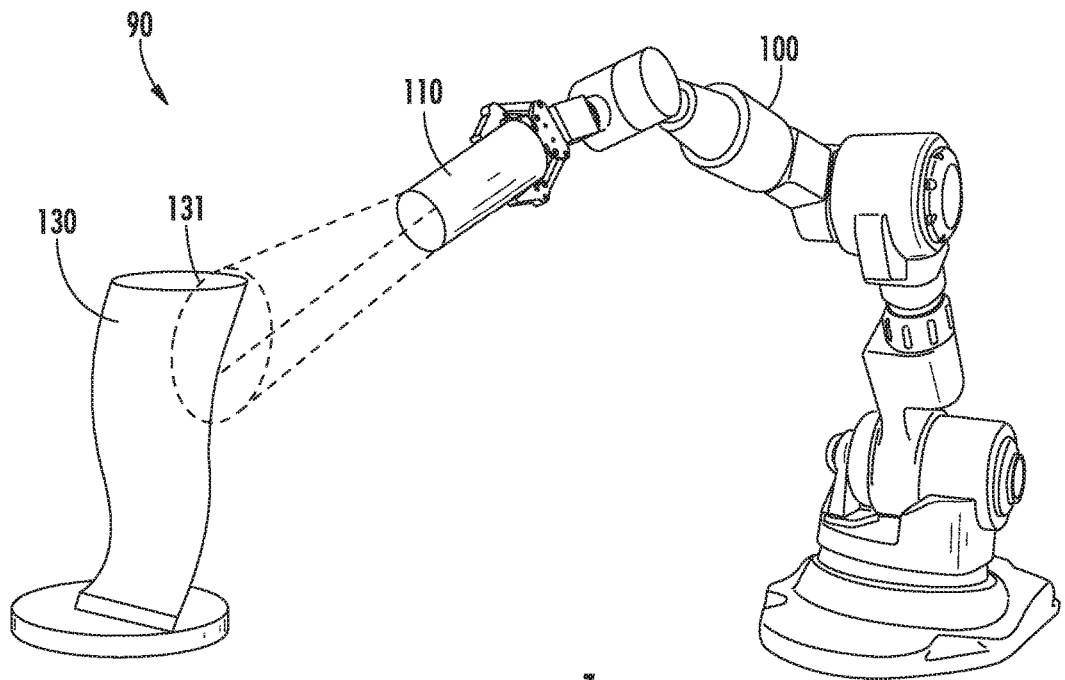
FIG. 1 is an exemplary embodiment of a robotic sensing apparatus.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Robotic sensing apparatuses and methods of sensor planning that may capture samples of an area of interest while minimizing redundancy and time are generally provided. The methods and systems described herein may include steps or operations that may capture samples of an area of interest, such as a component, or assembly, or geographic area, at a desired resolution and level of completeness while minimizing the quantity of samples, such as images or measurements, taken to capture the area of interest. Various embodiments of the robotic sensing apparatuses and methods described herein may utilize a deep learning approach in conjunction with sensor planning. Furthermore, the systems and methods described herein may generally autonomously plan and capture a minimal quantity of samples to capture the area of interest at a desired level of completeness.

Figure 2:
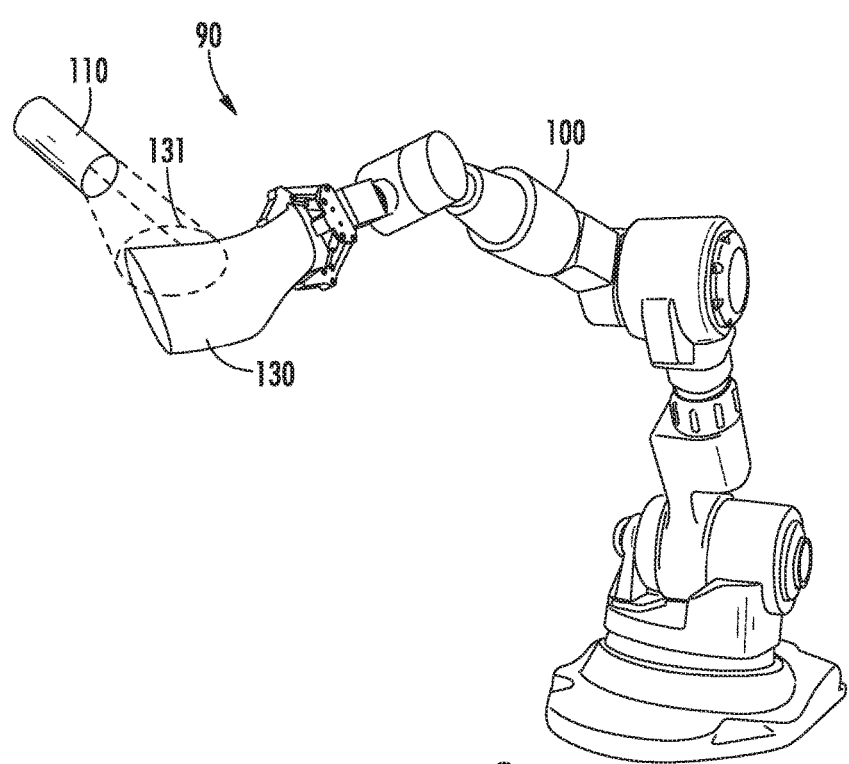
FIG. 2 is an exemplary embodiment of another robotic sensing apparatus.

Referring now to FIGS. 1 and 2, a robotic sensing apparatus for sensor planning 90 (herein referred to as "apparatus 90") includes one or more sensors 110 acquiring samples of an area of interest 130. The one or more sensors 110 may include an imaging device, a proximity sensor, or combinations thereof. In one embodiment, imaging devices may generally include cameras. In another embodiment, imaging devices may specifically include interferometers, such as, but not limited to, optical coherence tomography (e.g., white light scanners or blue light scanners). In other embodiments, the one or more sensors 110 include proximity sensors, in which the proximity sensors may generally include sensors that may emit and/or retrieve electromagnetic signals and process changes in said electromagnetic signals. For example, proximity sensors may include, but are not limited to, capacitive, infrared, inductive, magnetic, sonic or ultrasonic proximity sensors, radar, LIDAR, or laser rangefinders. In various embodiments, the one or more sensors 110 may include combinations of imaging devices and/or proximity sensors. In various embodiments, the one or more sensors 110 acquire samples, including images or measurements, at various resolutions, angles, distances, orientations, sampling or measurement rates, frequencies, etc.

Figure 4:
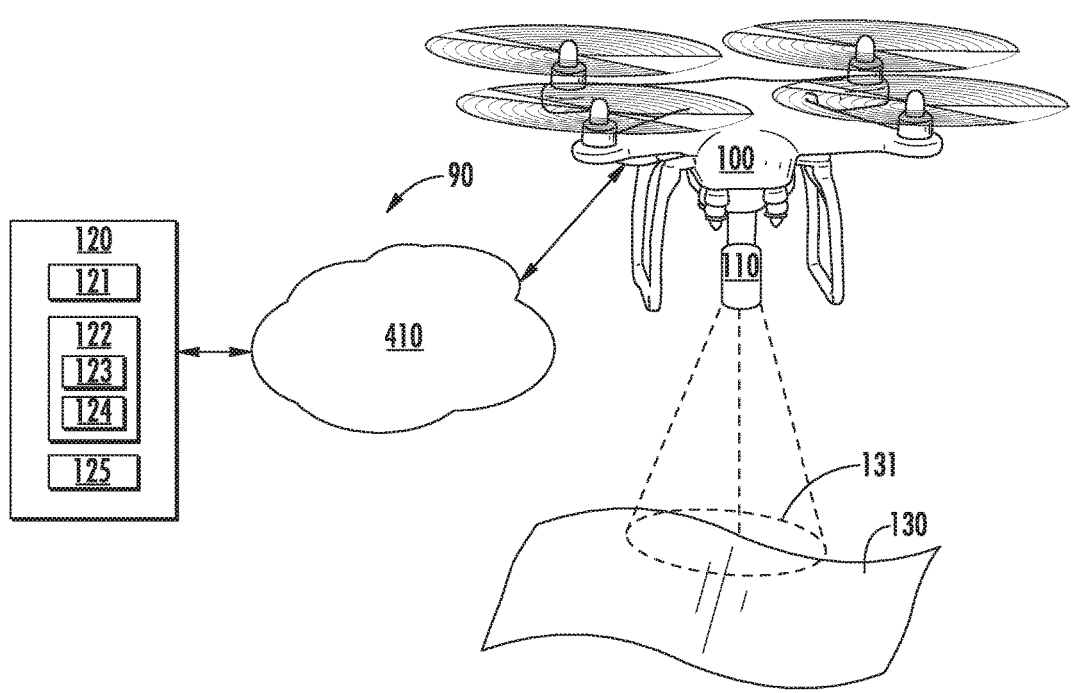
FIG. 4 is an exemplary embodiment of yet another robotic sensing apparatus.

In one embodiment, the apparatus 90 includes a translatable robotic apparatus 100 (herein referred to as "robot 100"). The robot 100 may include a movable fixture, such as a robotic arm as shown in FIGS. 1 and 2, or an autonomous mobile vehicle, such as a drone as shown in FIG. 4. Translations of the robot 100, the one or more sensors 110, and/or the area of interest 130 may include, but are not limited to, six-axis movements (e.g. up/down, side/side, forward/backward, etc.), pivots, turns, rotations, and/or displacements at constant or variable rates of motion. In the embodiments shown in FIGS. 1 and 2, the sensor(s) 110 may be mounted to the robot 100 in which the robot 100 translates the sensor 110 to various portions 131 of an area of interest 130 at various angles or distances relative to the area of interest 130.

In other embodiments of the apparatus 90, the robot 100 may translate the area of interest 130 relative to the one or more sensors 110. For example, the robot 100, such as a robotic arm, may translate the area of interest 130 relative to one or more fixed sensors 110. The robot 100 may translate the area of interest 130 to various distances, angles, and/or orientations relative to the one or more sensors 110.

Figure 3:
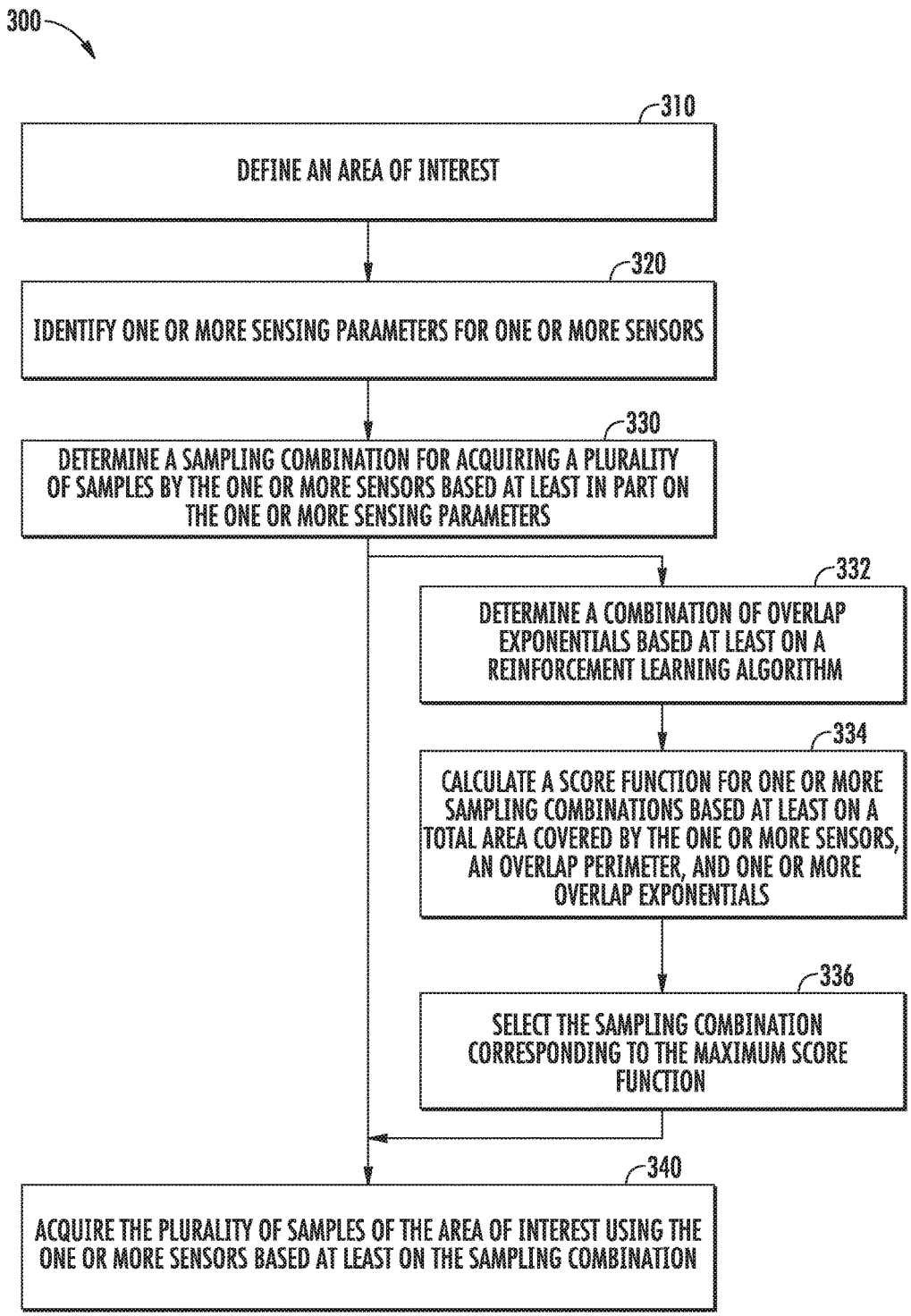
FIG. 3 is a flowchart outlining an exemplary method of sensor planning.

Referring now to FIG. 3, a flowchart outlining steps of an exemplary embodiment of a method of sensor planning 300 (herein referred to as "method 300") is generally provided. The method 300 shown in FIG. 3 may be implemented by the apparatus 90 shown and described in regard to FIGS. 1 and 2. The method 300 may further be implemented by one or more computing devices, such as the computing device 120 described in regard to FIG. 4. FIG. 3 depicts steps performed in a particular order for purposes of illustration and discussion. Those of ordinary skill in the art, using the disclosures provided herein, will understand that various steps of any of the methods disclosed herein can be modified, adapted, expanded, rearranged and/or omitted in various ways without deviating from the scope of the present disclosure.

The method 300 can include at (310) defining, by one or more computing devices, an area of interest, at (320) identifying, by the one or more computing devices, one or more sensing parameters for the one or more sensors, at (330) determining, by the one or more computing devices, a sampling combination for acquiring a plurality of samples by the one or more sensors based at least in part on the one or more sensing parameters, and at (340) providing, by one or more computing devices, one or more command control signals to an apparatus including the one or more sensors to acquire the plurality of samples of the area of interest using the one or more sensors based at least on the sampling combination.

At (310), the method 300 may include defining an area of interest. In one embodiment, defining an area of interest includes receiving a point cloud. Receiving a point cloud may include receiving an image file, such as a computer-aided design (CAD) file, of the area of interest. The image file may include a nominal file of the area of interest to which the samples from the sensors may measure in comparison.

In another embodiment, defining an area of interest may include defining a finite space in which a robot and/or one or more sensors may operate, such as the robot 100 and/or one or more sensors 110 shown in FIGS. 1, 2, and 4. For example, the extent to which the robot 100 may translate may be spatially limited. In one example, the robot 100, as a robotic arm, may be limited in its range of motion, extension, etc. In another example, the robot 100, as a drone, may be geographically limited by coordinates, operating range, or operating envelope, such as altitude, speed, maneuverability, etc. Therefore, defining an area of interest may include defining a 2D or 3D space in which samples may be taken.

In still other embodiments, defining an area of interest may include taking a sample of the area of interest. For example, taking a sample of the area of interest may include taking a sample that broadly captures the area of interest, including a perimeter of the area of interest. Broadly capturing the area of interest may include sampling at a low resolution, or a large distance from the area of interest, or otherwise in minimal detail to obtain and define a periphery of the area of interest. In various embodiments, broadly capturing the area of interest may include capturing the defined spatial area as limited by coordinates, operating range, operating envelope, etc. In other embodiments, broadly capturing the area of interest may be dependent on a maximum sampling area of one or more sensors such that the area of interest may be defined by the one or more sensing parameters.

At (320), the method 300 includes identifying one or more sensing parameters for the one or more sensors. In one embodiment, identifying one or more sensing parameters may include defining one or more of a measurement resolution, a field of view, and/or a depth of field. Defining the measurement resolution may include defining a lateral resolution, a lens resolution, an image resolution, and/or a sensor resolution. Defining a sensor resolution may include defining a spatial and/or temporal sensor resolution.

In another embodiment, identifying one or more sensing parameters may include defining a total area covered by the one or more sensors. For example, defining a total area covered by the one or more sensors may be a function of one or more of the defined aforementioned resolutions. As another non-limiting example, such as shown and described in regard to FIGS. 1, 2, and 4, defining a total area covered may be approximately equal to or less than the portion 131 of the area of interest 130 captured by the one or more sensors 110. In one embodiment, the total area covered by the one or more sensors may be a function of one or more of the defined aforementioned resolutions and additional user-defined limits based at least on a desired sample quality. For example, defining the total area covered may include defined hardware capabilities of the one or more sensors and a subset of said hardware capabilities based at least on a user-defined limitation. The user-defined limitation may be based generally on good visibility standards as defined by the user. Good visibility standards may be based at least on a measurement resolution, a field of view, and/or depth of field of the one or more sensors.

In still other embodiments at (320), identifying one or more sensing parameters may include calculating a curvature and/or normal vector of at least a portion of the area of interest. Calculating the curvature and/or normal vector may be based at least on a surface of the point cloud or image file defined in (310). The normal vector may define one or more sensor centers. For example, referring to FIGS. 1 and 2, the normal vector may define one or more centerlines 111 of the one or more sensors 110 relative to the portion 131 of the area of interest 130. As another non-limiting example, the normal vector may define an angle of view 112 of the sensor 110 relative to the area of interest 130, or the portion 131 thereof.

At (330), the method 300 includes determining a sampling combination for acquiring a plurality of samples by the one or more sensors based at least in part on the one or more sensing parameters. The sampling combination may be a combination of samples of the area of interest pursuant to capturing the area of interest. The combination of samples of the area of interest may include translations of the sensor(s) and/or the area of interest relative to one another. The sampling combination may further be a combination of sensing parameters relative to translations of the sensor(s) and/or the area of interest. In various embodiments, the sampling combination may include combinations of samples of various portions of the area of interest taken to capture the area of interest. For example, referring to FIG. 1, 2 or 4, the sampling combination may include a specific sequence of translations and/or sensing parameters at various portions 131 of the area of interest 130 until the area of interest 130 is captured. The specific sequence of translations and/or sensing parameters may include distances, angles, and/or resolutions of the one or more sensor 110 relative to the area of interest 130 for each sample captured of the portion 131 of the area of interest 130.

Determining a sampling combination to be acquired by the one or more sensors may further include determining a minimal quantity of samples to acquire to capture the area of interest. In one embodiment, determining a sampling combination to be acquired by the one or more sensors may include selecting the sampling combination based at least on a score function, $$F_\lambda(c_0, c_1, \ldots, c_r) = \frac{\text{Total area covered}}{(\text{Overlap Perimeter})^\lambda}$$

for one or more sampling combinations $(c_0, c_1, \ldots, c_r)$. The total area covered is based at least on one or more sensing parameters or the portion of the area of interest. The overlap perimeter is a quantity of the sample that is redundant (e.g. overlapping) a previous sample. Lambda $\lambda$ is an overlap exponential. The overlap exponential is a factor by which overlap between the sample and a previous sample is encouraged. For example, $\lambda=0$ may discourage overlap and encourage sampling combinations including samples with large total areas covered. However, $\lambda=0$ may result in sampling combinations in which portions of the area of interest are uncaptured between the samples. As another example, $\lambda>0$ may encourage overlap to ensure portions of the area of interest between the samples (e.g. gaps) are captured. However, $\lambda>0$ may result in large quantities of samples, or translations of the sensor(s) or area of interest, for a given sampling combination to capture the area of interest.

In another embodiment, determining a sampling combination to be acquired by the one or more sensors may include at (332) determining a combination of overlap exponentials based at least on a reinforcement learning (RL) algorithm, at (334) calculating a score function for one or more sampling combinations based at least on a total area covered by the one or more sensors, an overlap perimeter, and the one or more overlap exponentials, and at (336) selecting the sampling combination corresponding to a maximum score function.

At (332), the method 300 may include using at least one of a State-Action-Result-State-Action (SARSA), Q-Learning, and Policy Gradient RL algorithm to determine a combination of overlap exponentials that may output a sampling combination that may minimize a quantity of samples taken of the area of interest pursuant to capturing the area of interest to a desired level of completeness. In various embodiments, at least one of the Q-Learning and Policy Gradient PL algorithms may be used in conjunction with a deep learning approach to determine a minimal quantity of samples for capturing the area of interest at a desired level of completeness. Determining the combination of overlap exponentials may include determining combinations of zero and non-zero overlap exponentials that may result in a maximum score function while capturing the area of interest in a minimal quantity of samples to a desired level of completeness.

At (340), the method 300 includes acquiring the plurality of samples using the one or more sensors based at least on the sampling combination. In one embodiment, acquiring the plurality of samples may include translating the one or more sensor(s) and/or the area of interest relative to one another. For example, referring to FIG. 1, 2, or 4, the one or more sensors 110 and/or the area of interest 130 may be mounted to the robot 100 and translate to capture samples at a plurality of portions 131 of the area of interest 130 until the area of interest 130 is captured in desired detail and completeness. In another embodiment, the method 300 may be implemented to determine positions, placements, setups, orientations, distances, etc. of one or more sensors relative to the area of interest using the determined sampling combination. For example, within the defined area of interest, such as a 2D or 3D space, the determined sampling combination may provide positions, placements, and orientations of sensors such that a minimal quantity of sensors is utilized to capture the area of interest within the 2D or 3D space to a desired level of detail and completeness.

FIG. 4 depicts an example apparatus 90 according to exemplary embodiments of the present disclosure. The apparatus 90 can include one or more sensors 110, a robot 100, and one or more computing devices 120. In one embodiment, the robot 100 defines a robotic arm such as shown in regard to FIGS. 1 and 2. In another embodiment, such as shown in FIG. 4, the robot 100 defines an autonomous mobile vehicle, such as a drone. The one or more sensors 120, the robot 100, and/or the computing device 120 can be configured to communicate via more or more network(s) 410, which can include any suitable wired and/or wireless communication links for transmission of the communications and/or data, as described herein. For instance, the network 410 can include a SATCOM network, ACARS network, ARINC network, SITA network, AVICOM network, a VHF network, a HF network, a Wi-Fi network, a WiMAX network, a gatelink network, etc.

The computing device(s) 120 can include one or more processor(s) 121 and one or more memory device(s) 122. The one or more processor(s) 121 can include any suitable processing device, such as a microprocessor, microcontroller, integrated circuit, logic device, and/or other suitable processing device. The one or more memory device(s) 122 can include one or more computer-readable media, including, but not limited to, non-transitory computer-readable media, RAM, ROM, hard drives, flash drives, and/or other memory devices.

The one or more memory device(s) 122 can store information accessible by the one or more processor(s) 121, including computer-readable instructions 123 that can be executed by the one or more processor(s) 121. The instructions 123 can be any set of instructions that when executed by the one or more processor(s) 121, cause the one or more processor(s) 121 to perform operations. In some embodiments, the instructions 123 can be executed by the one or more processor(s) 121 to cause the one or more processor(s) 121 to perform operations, such as any of the operations and functions for which the computing device(s) 120 are configured, the operations for sensor planning (e.g., method 300), as described herein, the operations for defining or receiving an area of interest, the operations for identifying or receiving one or more sensing parameters for the one or more sensors, the operations for determining a sampling combination for acquiring a plurality of samples by the one or more sensors based at least in part on the one or more sensing parameters, the operations for acquiring the plurality of samples of the area of interest using the one or more sensors based at least on the sampling combination, and/or any other operations or functions of the one or more computing device(s) 120. The instructions 123 can be software written in any suitable programming language or can be implemented in hardware. Additionally, and/or alternatively, the instructions 123 can be executed in logically and/or virtually separate threads on processor(s) 121. The memory device(s) 122 can further store data 124 that can be accessed by the processor(s) 121. For example, the data 124 can include the one or more of the samples, the sampling combinations, the sensing parameters, the defined area of interest, the score function, the RL algorithm, the combinations of overlap exponentials, and/or any other data and/or information described herein.

The computing device(s) 120 can also include a network interface 125 used to communicate, for example, with the other components of apparatus 90 (e.g., via network 410). The network interface 125 can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of sensor planning for acquiring samples via an apparatus including one or more sensors, the computer-implemented method comprising:

defining, by one or more computing devices, an area of interest;

identifying, by the one or more computing devices, one or more sensing parameters for the one or more sensors;

determining, by the one or more computing devices, a sampling combination for acquiring a plurality of samples by the one or more sensors based at least in part on the one or more sensing parameters, wherein determining the sampling combination comprises:

determining, by one or more computing devices, a combination of overlap exponentials based at least on a reinforcement learning algorithm;

calculating, by one or more computing devices, a score function for one or more sampling combinations based at least on a total area covered by the one or more sensors, an overlap perimeter, and the overlap exponentials; and selecting, by one or more computing devices, the sampling combination corresponding to a maximum score function; and providing, by the one or more computing devices, one or more command control signals to the apparatus including the one or more sensors to acquire the plurality of samples of the area of interest using the one or more sensors based at least on the sampling combination.

2. The computer-implemented method of claim 1, wherein the reinforcement learning algorithm comprises using at least one of a SARSA, Q-Learning, and Policy Gradient reinforcement learning algorithm.

3. The computer-implemented method of claim 1, wherein determining a combination of overlap exponentials based at least on a reinforcement learning algorithm comprises determining combinations of zero and non-zero overlap exponentials.

4. The computer-implemented method of claim 1, wherein determining a sampling combination for acquiring a plurality of samples by the one or more sensors is based at least on a score function, wherein the score function is a function of at least one of a total area covered, an overlap perimeter, and an overlap exponential.

5. The computer-implemented method of claim 1, wherein identifying one or more sensing parameters includes calculating a curvature and/or normal vector of at least a portion of the area of interest.

6. The computer-implemented method of claim 1, wherein identifying one or more sensing parameters includes defining a total area covered by the one or more sensors.

7. The computer-implemented method of claim 1, wherein identifying one or more sensing parameters includes defining one or more of a measurement resolution, a field of view, and/or a depth of field.

8. The computer-implemented method of claim 1, wherein defining an area of interest includes receiving a point cloud.

9. The computer-implemented method of claim 1, wherein defining an area of interest includes defining a finite space in which the one or more sensors operates.

10. The computer-implemented method of claim 1, wherein acquiring the plurality of samples includes translating one or more sensors and/or translating the area of interest.

11. The computer-implemented method of claim 1, wherein identifying one or more sensing parameters includes defining one or more translations of the one or more sensors.

12. The computer-implemented method of claim 1, wherein the one or more sensors is an imaging device, a proximity sensor, or a combination thereof.

13. A robotic sensing apparatus for sensor planning, the robotic sensing apparatus comprising one or more sensors and a computing device comprising one or more processors and one or more memory devices, the one or more memory devices storing instructions that when executed by the one or more processors cause the one or more processors to perform operations, the operations comprising:
receiving an area of interest;
receiving one or more sensing parameters for the one or more sensors;
determining a sampling combination for acquiring a plurality of samples by the one or more sensors, wherein determining the sampling combination comprises:
determining a combination of overlap exponentials based at least on a reinforcement learning algorithm;
calculating a score function for one or more sampling combinations based at least on a total area covered by the one or more sensors, an overlap perimeter, and the overlap exponentials; and
selecting the sampling combination corresponding to a maximum score function; and
acquiring the plurality of samples using the one or more sensors based at least on the sampling combination.

14. The robotic sensing apparatus of claim 13, wherein determining a combination of overlap exponentials based at least on a reinforcement learning algorithm includes using a SARSA, Q-Learning, or Policy Gradient reinforcement learning algorithm.

15. The robotic sensing apparatus of claim 13, wherein determining a combination of overlap exponentials based at least on a reinforcement learning algorithm includes determining combinations of zero and non-zero overlap exponentials.

16. The robotic sensing apparatus of claim 13, wherein acquiring the plurality of samples includes translating one or more sensors and/or translating the area of interest.

17. The robotic sensing apparatus of claim 13, wherein the one or more sensors is an imaging device, a proximity sensor, or a combination thereof.

18. An apparatus for sensor planning, the apparatus comprising:
a translating robotic apparatus;
one or more sensors mounted to the translating robotic apparatus; and
one or more computing devices configured to operate the translating robotic apparatus and the one or more sensors, wherein the computing device stores operations, the operations comprising:
defining an area of interest;
identifying one or more sensing parameters for the one or more sensors;
determining a sampling combination for acquiring a plurality of samples by the one or more sensors based at least in part on the one or more sensing parameters, wherein determining the sampling combination comprises:
determining a combination of overlap exponentials based at least on a reinforcement learning algorithm;
calculating a score function for one or more sampling combinations based at least on a total area covered by the one or more sensors, an overlap perimeter, and the overlap exponentials; and
selecting the sampling combination corresponding to a maximum score function; and
providing one or more command control signals to the apparatus including the one or more sensors to acquire the plurality of samples of the area of interest using the one or more sensors based at least on the sampling combination.

* * * * *